UNITED STATES PATENT OFFICE.

CHARLES H. ROCKWELL, OF CLEVELAND, OHIO.

PROCESS OF MANUFACTURING MINERAL WOOL.

SPECIFICATION forming part of Letters Patent No. 447,360, dated March 3, 1891.

Application filed February 21, 1888. Serial No. 264,818. (No specimens.)

*To all whom it may concern:*

Be it known that I, CHARLES H. ROCKWELL, a citizen of the United States, and a resident of the city of Cleveland, in the county of Cuyahoga and State of Ohio, have invented certain new and useful Improvements in the Process of Manufacturing Mineral Wool, of which the following is a specification.

My invention relates to improvements in the manufacture of the substance known as "mineral wool," and has for its object the production of mineral wool of a better quality and at a less cost than by the methods heretofore and now in use, and by the method employed I also obtain a constant supply of the flux or cinder from which the mineral wool is blown.

By the present process of manufacture the molten slag is taken from a blast-furnace in a metal car to the blowing device, where the car is tapped and the wool blown as the molten slag runs from the car. There are, among others, four great objections to this method, which my invention is designed to overcome.

First. The production of the mineral wool is dependent upon the operation of the blast-furnace, and when, for any reason, the blast-furnace fails to supply the molten slag the manufacture of the mineral wool must stop.

Second. Only one car-load of slag can be taken from one run or flush of the furnace, so that the supply is interrupted until another run or flush.

Third. It is shown by experience that much of the slag as it comes from the blast-furnace either fails entirely to make mineral wool, or the product is of an inferior quality and of no use. The adaptability of the molten slag can be determined only by the commencement of the blowing, and when the slag proves to be defective it must be disposed of as débris, whereby the run of the furnace is lost and time and labor expended in disposing of the useless slag. It is, moreover, found that the entire slag product of some blast-furnaces, by reason of the nature of the ore used, is wholly unfit for the manufacture of mineral wool from the molten slag as it comes from the furnace.

Fourth. When the slag is of good quality, a large portion of each car-load becomes cooled before it can be used, which cooled portion must be disposed of as débris.

Attempts have heretofore been made to overcome the objections hereinbefore suggested for the slag from a blast-furnace—a molten product obtained by fusing various kinds of stone used in certain definite proportions in a cupola; but the expense of the stone makes the cost of the production much greater than by the process hereinafter described.

Attempts have also been made to remelt the slag uncombined with other material, but the results have been failures. By experiment I have discovered that by mixing lime or silica or lime or silica bearing stone, or both, with the hardened slag and fusing the mixture in a cupola a constant supply of remelted slag can be obtained, from which a mineral wool can be produced of better and more uniform quality than that produced by the use of the molten slag drawn directly from the blast-furnaces, and at the same time each of the objections hereinbefore referred to is overcome. Whether lime or silica, or both, shall be used depends upon the nature of the slag. This can be determined, for one or two inexpensive trials will decide which and whether both of the ingredients named should be used. The proportion of each ingredient to be used will also depend upon the nature of the slag to be determined in like manner by trial. In all cases the proportion of lime or silica, or both, will be small.

In the use of ordinary slag I have found the following proportions to produce good results, viz: slag, eighty per cent.; limestone, fifteen per cent.; quartz pebbles, (silica,) five per cent. In many cases the slag will be found to be so silicious as to render the addition of quartz pebbles or silica unnecessary; but I do not confine myself to the proportion named.

The mixture is fused in any ordinary cupola or furnace similar to those now in use for that purpose, which need not now be described or shown.

What I claim, and desire to secure by Letters Patent, is—

1. The process of manufacturing mineral wool, consisting of remelting hardened slag or scoria from a smelting-furnace with lime and silica or lime and silica bearing stone mixed in proper proportions and blowing the same into mineral wool, substantially as described.

2. The process of manufacturing mineral wool, consisting of remelting hardened slag or scoria from a smelting-furnace, with lime or lime-bearing stone mixed in proper proportions and blowing the same into mineral wool, substantially as described.

Signed at Cleveland, in the county of Cuyahoga and State of Ohio, this 9th day of February, A. D. 1888.

CHARLES H. ROCKWELL.

Witnesses:
A. H. MASSEY,
D. W. ROCKWELL.